Patented Feb. 7, 1950

2,496,461

UNITED STATES PATENT OFFICE 2,496,461

MANUFACTURE OF NUT BUTTER

George A. Fisher, Selinsgrove, Pa., assignor to Wm. S. Scull Company, Camden, N. J., a corporation of New Jersey No Drawing. Application October 2, 1945, Serial No. 619,890

2 Claims. (Cl. 99—128)

My invention relates to the manufacture of nut butter and is particularly useful in the manufacture of nut butter from the oilier nuts.

In the manufacture of nut butter, it has been found desirable to add certain edible oils in small quantities for a number of reasons; for example, to prevent segregation of the nut oil, improve the consistency of the final product and, in some cases, to improve the flavor.

One of the great difficulties which has been encountered in the preparation of nut butter is the effect of the oxidation of the particular oil used in the preparation of the product and this is particularly true in the case of the oilier nuts. For example, in the case of peanut butter the oil which is expressed from the nuts during grinding also oxidizes relatively rapidly and the oxidation of the peanut oil and the oil used in the process produce undesired rancidity in the product in relatively few days.

Many efforts have been made to overcome the deterioration caused by the rancidity but a satisfactory product has not been secured by present methods.

It is the primary object of my invention to overcome the oxidation of the oils used in the treatment of the nuts and the oil found in the nuts themselves, to prevent rancidity of the product during storage and when opened for use by the consumer. I have discovered that objectionable oxidation of the oil in the nut products and the resulting rancidity can be almost entirely eliminated by treating the nuts in the following manner. (Note—In the specification and claims I use the term "stable" and "stabilized" to indicate stability with respect to resistance and oxidation and consequent rancidity.)

I will describe the preparation of peanut butter but it will be understood that the treatment is applicable to other nuts. The whole peanuts are first shelled, roasted to the extent necessary to produce the desired flavor and then skinned. The nuts are then brought into contact with melted whole butter (i. e. the usual dairy product made from cream) which has been heated preferably to a temperature between 250° F. and 400° F. for a period of about 10-20 minutes. This melted butter is applied to the nuts either by immersing the nuts in the butter, by spraying the butter on the nuts, or in any other known manner and the nuts are then salted to produce the desired salty flavor in the ultimate product.

The nuts are next comminuted and in this comminuting of the nuts I have found it desirable to avoid any crushing or grinding as this has the effect of rupturing the oil cells, producing non-uniform particle size and texture and expresses an undesirable amount of the peanut oil. I have found that the process of comminuting the nuts set forth in my Patent No. 2,307,398 produces superior results for in that process the nuts are comminuted to a fine particle size with a minimum of cell rupture and oil expressage. After the nuts have been comminuted, it is desirable that the product be packed in vacuum cans or jars in order to eliminate exposure to the air. Also, if desired, instead of roasting the nuts, the nuts could be cooked in the whole butter.

The time and temperature used in the process will depend on the results desired. From the point of view of securing the best anti-oxygenic qualities, I have found that the most effective time-temperature relation to be 10 minutes at 400° F., but this does not produce the best flavor. For a better flavor the temperature should be lower and I have found that treatment in the neighborhood of 250° F. improves the flavor of the product considerably and even lower temperatures might be used in some cases. If desired the time can also be lengthened when lower temperatures are used. For example, the time of treatment at 250° could be 15 to 20 minutes and by treating for a longer time the temperature could be lowered even further.

In general it may be said that the best anti-oxygenic results are secured with the 400°-10 minute treatment and the extent of variation from this relation will depend on how far it is desirable to sacrifice the anti-oxygenic qualities to improve the flavor of the product.

It will also be understood that within certain limits the time and temperature are correlative factors, i. e., the time may be shortened if the temperature is raised and must be lengthened when it is not.

I am unable to explain why it is that the treatment of the peanuts with whole butter heated as described produces the excellent results which I have obtained in the preparation of peanut butter. The use of butter fat as distinguished from whole butter produces very unsatisfactory results and as a matter of fact the oxidation of the oil is much more rapid if heated butter fat is used—more rapid in fact than when unheated whole butter is used. Whatever the explanation of the factors responsive for producing the anti-oxygenic effect may be, there is no question that the ultimate product is much improved. I am of the opinion that the treatment of the whole butter as described not only produces anti-oxygenic effects in the butter fat itself but that the use of such treated butter also inhibits oxidation of any peanut oil which may be expressed in the process of manufacturing peanut butter for the stability of butter prepared as above described is much superior to that of any nut butter now on the market with which I am familiar.

I claim:

1. The process of preparing a substantially stabilized nut butter which comprises roasting the whole nuts, applying to the unground nuts whole butter which has been heated to a temperature between 250° F. and 400° F. for a period of not less than 10 to 20 minutes, and thereafter comminuting the nuts.

2. The process of preparing a substantially stabilized nut butter which comprises heating whole butter to a temperature between 250° F. and 400° F., introducing into the heated butter unroasted whole nuts for a period of 10 to 20 minutes, and thereafter comminuting the nuts.

GEORGE A. FISHER.

REFERENCES CITED

The following references are of record in the file of this patent:

UNITED STATES PATENTS

| Number | Name | Date |
|---|---|---|
| 1,620,898 | Kidd | Mar. 15, 1927 |
| 1,731,647 | Beattie | Oct. 15, 1929 |
| 2,280,365 | Baier | Apr. 21, 1942 |
| 2,307,398 | Fisher | Jan. 5, 1943 |